United States Patent
McCauley

(10) Patent No.: US 9,259,094 B1
(45) Date of Patent: Feb. 16, 2016

(54) COMBINATION GROUND BLIND, WATER BLIND AND TRANSPORTATION CRATE

(71) Applicant: Ira D. McCauley, Defiance, MO (US)

(72) Inventor: Ira D. McCauley, Defiance, MO (US)

(*) Notice: Subject to any disclaimer, the term of this patent is extended or adjusted under 35 U.S.C. 154(b) by 0 days.

(21) Appl. No.: 14/147,507

(22) Filed: Jan. 4, 2014

Related U.S. Application Data

(60) Provisional application No. 61/749,266, filed on Jan. 5, 2013.

(51) Int. Cl.
*A47C 17/64* (2006.01)
*A47C 29/00* (2006.01)

(52) U.S. Cl.
CPC .............. *A47C 17/64* (2013.01); *A47C 29/003* (2013.01)

(58) Field of Classification Search
CPC .............................. A47C 17/64; A47C 29/003
USPC .......... 135/118, 151, 153, 143, 148; 108/130, 108/131, 134, 133; 5/113
See application file for complete search history.

(56) References Cited

U.S. PATENT DOCUMENTS

| | | | | |
|---|---|---|---|---|
| 702,567 | A * | 6/1902 | Kuhn | 5/113 |
| 947,341 | A * | 1/1910 | Lehmann | 5/113 |
| 947,472 | A * | 1/1910 | Lehmann | 5/113 |
| 1,004,796 | A * | 10/1911 | Lehmann | 5/113 |
| 1,262,600 | A * | 4/1918 | Purcell | 5/112 |
| 2,239,951 | A * | 4/1941 | Bromschwig | 5/119 |
| 2,641,776 | A * | 6/1953 | Jensen | 5/113 |
| 2,928,405 | A * | 3/1960 | Lawson | 135/95 |
| 3,278,953 | A * | 10/1966 | Willis | 5/113 |
| 3,584,322 | A * | 6/1971 | McDougall | A47C 29/006 135/134 |
| 3,601,825 | A * | 8/1971 | Moorhead et al. | 5/110 |
| 3,848,279 | A * | 11/1974 | Ipsen, Jr. | 5/113 |
| 3,886,609 | A * | 6/1975 | MacKenzie | A47C 17/82 5/110 |
| 4,318,353 | A * | 3/1982 | Schier | 108/132 |
| 4,914,768 | A * | 4/1990 | Howard | 5/113 |
| 5,072,694 | A * | 12/1991 | Haynes et al. | 119/482 |
| 5,390,839 | A | 2/1995 | Peters | |
| 5,449,014 | A * | 9/1995 | Yan-ho | 135/95 |
| 6,192,909 | B1 * | 2/2001 | Strausser | 135/137 |
| 6,715,446 | B2 * | 4/2004 | Chou | 119/497 |
| 7,231,891 | B2 | 6/2007 | Wood | |
| 7,322,315 | B2 * | 1/2008 | Brewer et al. | 119/498 |
| 7,789,044 | B2 * | 9/2010 | McGrade | 119/496 |
| 7,926,447 | B2 | 4/2011 | Flannery | |
| 8,066,022 | B2 | 11/2011 | Schlipf | |
| 2010/0229905 | A1 * | 9/2010 | Lin | 135/96 |
| 2011/0278808 | A1 * | 11/2011 | Kline | 280/43 |
| 2012/0000498 | A1 * | 1/2012 | Shih | 135/96 |

* cited by examiner

*Primary Examiner* — Noah Chandler Hawk
(74) *Attorney, Agent, or Firm* — Grace J. Fishel

(57) ABSTRACT

A combination transportation crate, ground blind and water blind for a dog reduces the amount of equipment necessary for a hunt. The combination includes a rectangular frame having a top and bottom side with a water permeable material attached to the frame forming a comfortable platform for the dog. A pair of front legs and a pair of rear legs are pivoted to the bottom side of the frame and a pair of canopy supports is pivoted to the top side of the frame. A cover is draped over the canopy supports and extends down over the rectangular frame forming an enclosure with a closable opening along at least one side of the rectangular frame through which the dog may enter and exit.

10 Claims, 4 Drawing Sheets

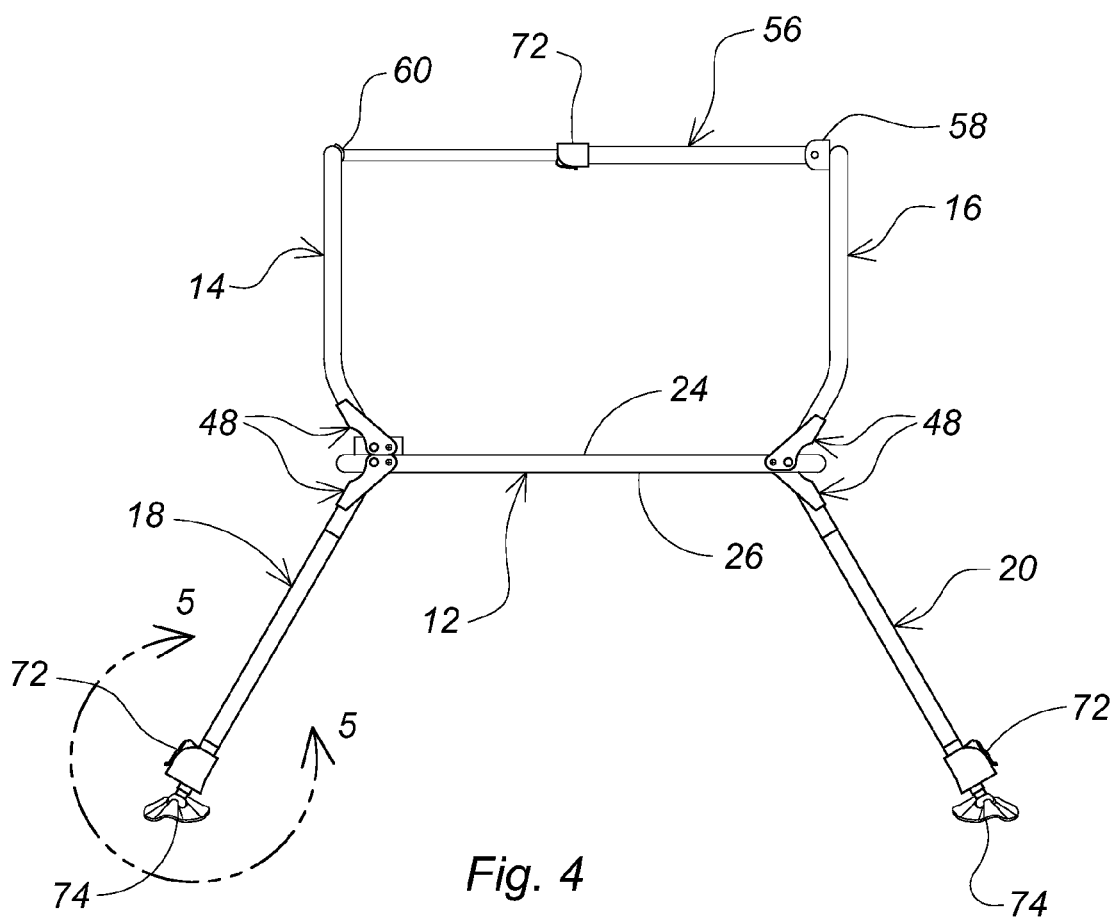
Fig. 4
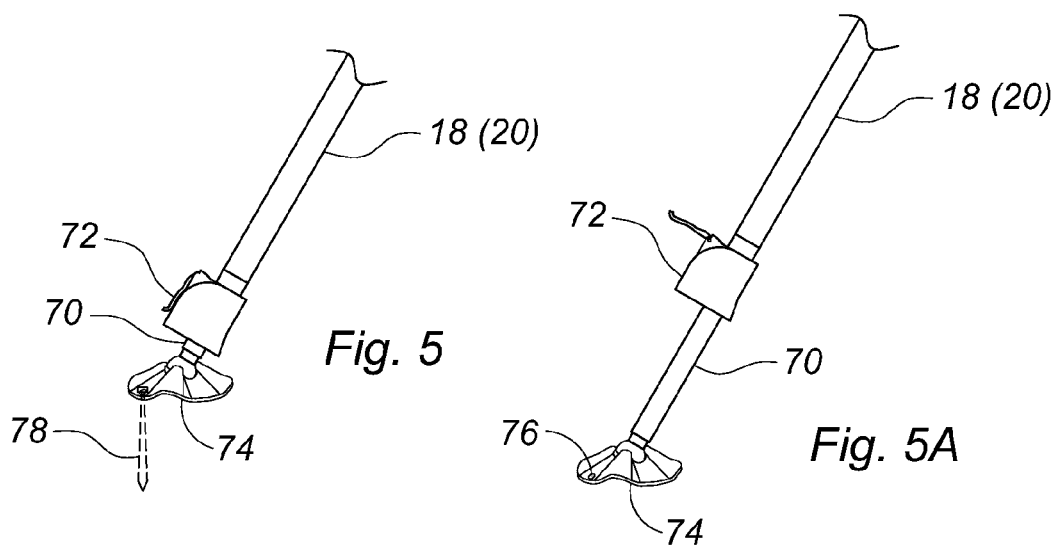
Fig. 5
Fig. 5A

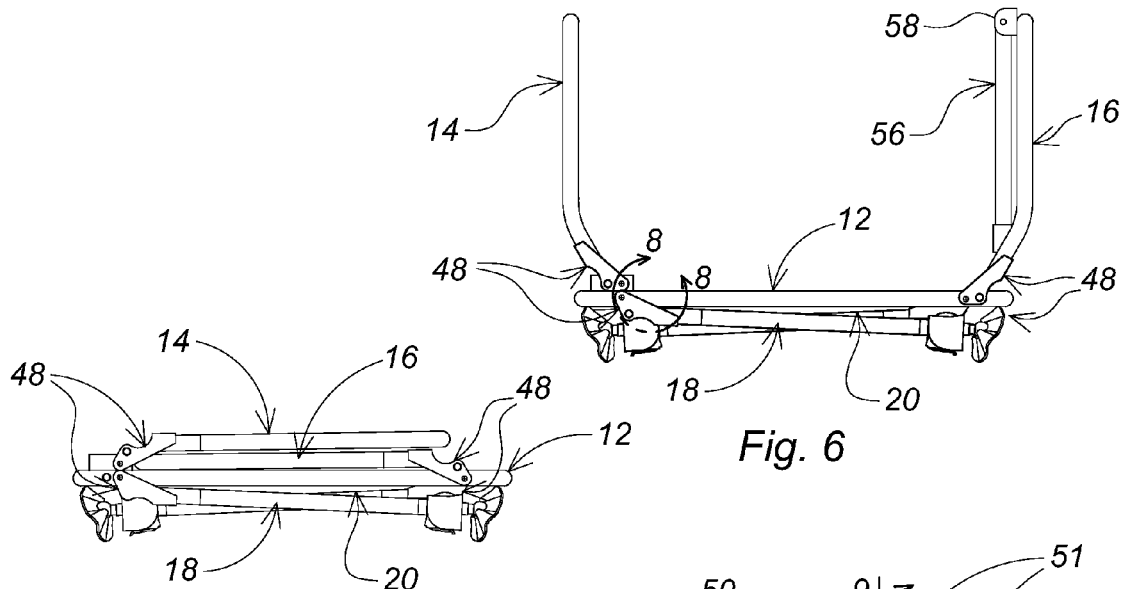
Fig. 6
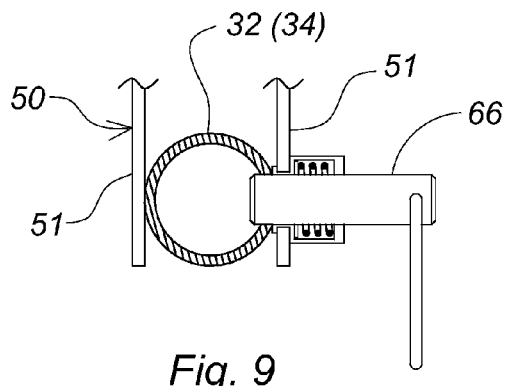
Fig. 7
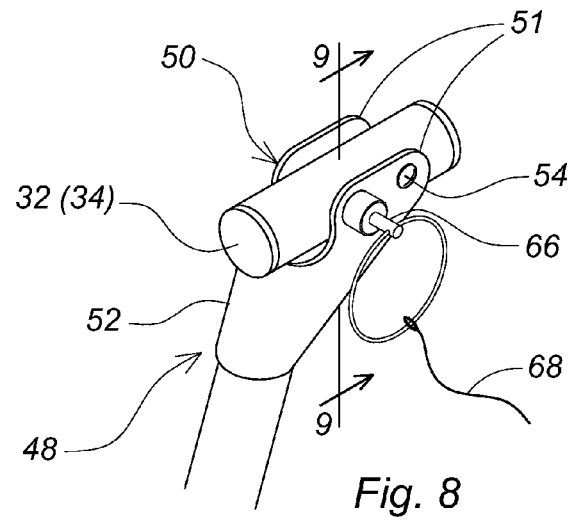
Fig. 9
Fig. 8
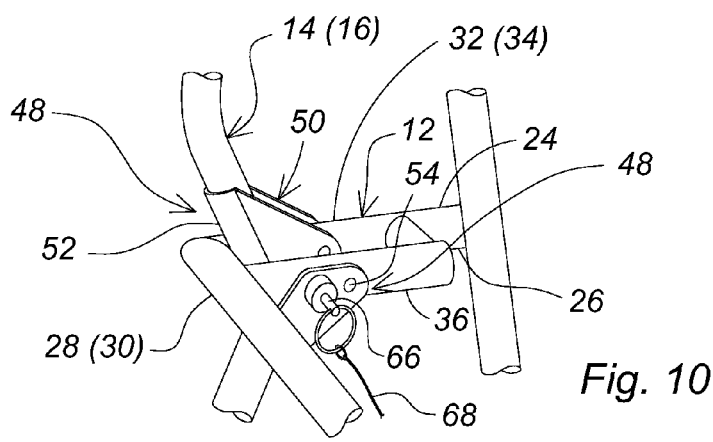
Fig. 10

COMBINATION GROUND BLIND, WATER BLIND AND TRANSPORTATION CRATE

BACKGROUND OF THE INVENTION

1. Field of the Invention

The present invention relates to a light-weight, compact multi-functional hunting apparatus which may be used a ground blind, water blind and transportation crate for a dog.

2. Brief Description of the Prior Art

In waterfowl hunting, a hunter often has to wait camouflaged for long periods of time before encountering any game. While the hunter is frequently prepared for the environment with suitable equipment, his dog often is not. There are portable dog water blinds and ground blinds for use in hunting waterfowl and upland game birds. While available portable dog stands may keep the dog out of cold water and mud, most offer no way to camouflage movement of the dog which may alert a wary duck or goose and spoil the hunt. There are ground blinds under which the dog is expected to sit or lie directly in contact with the ground which may be wet and icy. There are also collapsible kennels for transporting the dog in a vehicle to the hunting site. All these different devices results in a lot of bulky equipment to lug to a hunting site and for a hunter to store when not in use. In addition, the existing equipment in many instances does not provide for a quality hunting experience for the dog.

BRIEF SUMMARY OF THE INVENTION

In view of the above, it is an object of the present invention to provide a hunting apparatus that can be used as a transportation crate, ground blind and water blind. It is another object to improve a hunter's prospects and to keep his hunting companion dry and comfortable. It is also an object to provide a hunting apparatus that makes it easier to train a hunting dog not to creep out of a ground blind and that is fairer to the dog. Other objects and features of the invention will be in part apparent and in part pointed out hereinafter.

In accordance with the invention, a combination transportation crate, ground blind and water blind for a dog comprises a rectangular frame having a top and bottom side with a water permeable material attached to the frame forming a platform. A pair of front legs and a pair of rear legs are pivoted to the bottom side of the frame and a pair of canopy supports is pivoted to the top side of the frame. A cover is draped over the canopy supports and extends down over the rectangular frame forming an enclosure with a closable opening along at least one side of the rectangular frame.

The apparatus described above may reduce the amount of equipment necessary for a successful hunt. It can be used as a transportation crate and as a ground blind or water blind. Moreover, it provides features not found in existing single use equipment.

In one embodiment of the combination, a generally rectangular frame has a first end, a second end and two sides with a water permeable material releasably connected to the frame forming a platform. A first and second U-shaped frame, each of which has legs connected with a bight, are pivotally attached to the sides of the frame near the first and second ends, respectively. A support member that is adjustable in length interconnects the bights of the first and second U-shaped frames for tensioning the first and second U-shaped frames when they are pivoted generally perpendicular to the rectangular frame. In collapsed condition, the first and second U-shaped frames fold generally flat against a top surface of the rectangular frame.

A first pair of legs and a second pair of legs are pivotally attached to the sides of the frame near the first and second ends, respectively. At least one leg of each of said first and second pair of legs has a lock for securing the first and second pairs of legs when pivoted generally perpendicular to the rectangular frame in erect condition. Another feature is that each leg in said first and second pairs of legs is independently adjustable in length.

A flexible cover is supported by the first and second U-shaped frames in erect condition. Lower edges of the cover are adapted to extend around the rectangular frame sufficient to be releasably secured to an undersurface of said frame. At least one opening is provided in the cover near the first or second end of the frame. The opening is of a size sufficient to function as an entrance for the dog that will use the combination as a ground blind, water blind or transportation crate and is provided with a closure flap adapted to releasably close the opening.

In another embodiment, the legs of first and second pairs of legs terminate in an enlarged foot, one or more of which may have a hole adapted for use with a stake for staking the blind.

The invention summarized above comprises the constructions hereinafter described.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which:

FIG. 4 is a side elevation of the apparatus shown in FIG. 3;

FIG. 5 is a detail on an enlarged scale showing a distal end of a telescoping leg taken along line 5-5 in FIG. 4;

FIG. 5A is like FIG. 5 showing the leg extended;

FIG. 6 is a side elevation of the apparatus shown in FIG. 4 with the canopy supports unfolded and the legs folded;

FIG. 7 is a side elevation of the apparatus shown in FIG. 4 with both the canopy supports and legs folded;

FIG. 8 is a perspective view on an enlarged scale taken along line 8-8 in FIG. 6 showing a hinge assembly for attaching the legs to the frame;

FIG. 9 is a cross-section taken along the plane of 9-9 in FIG. 8; and,

FIG. 10 is a detail on an enlarged scale taken along line 10-10 in FIG. 3.

DETAILED DESCRIPTION OF THE INVENTION

Figure 1:
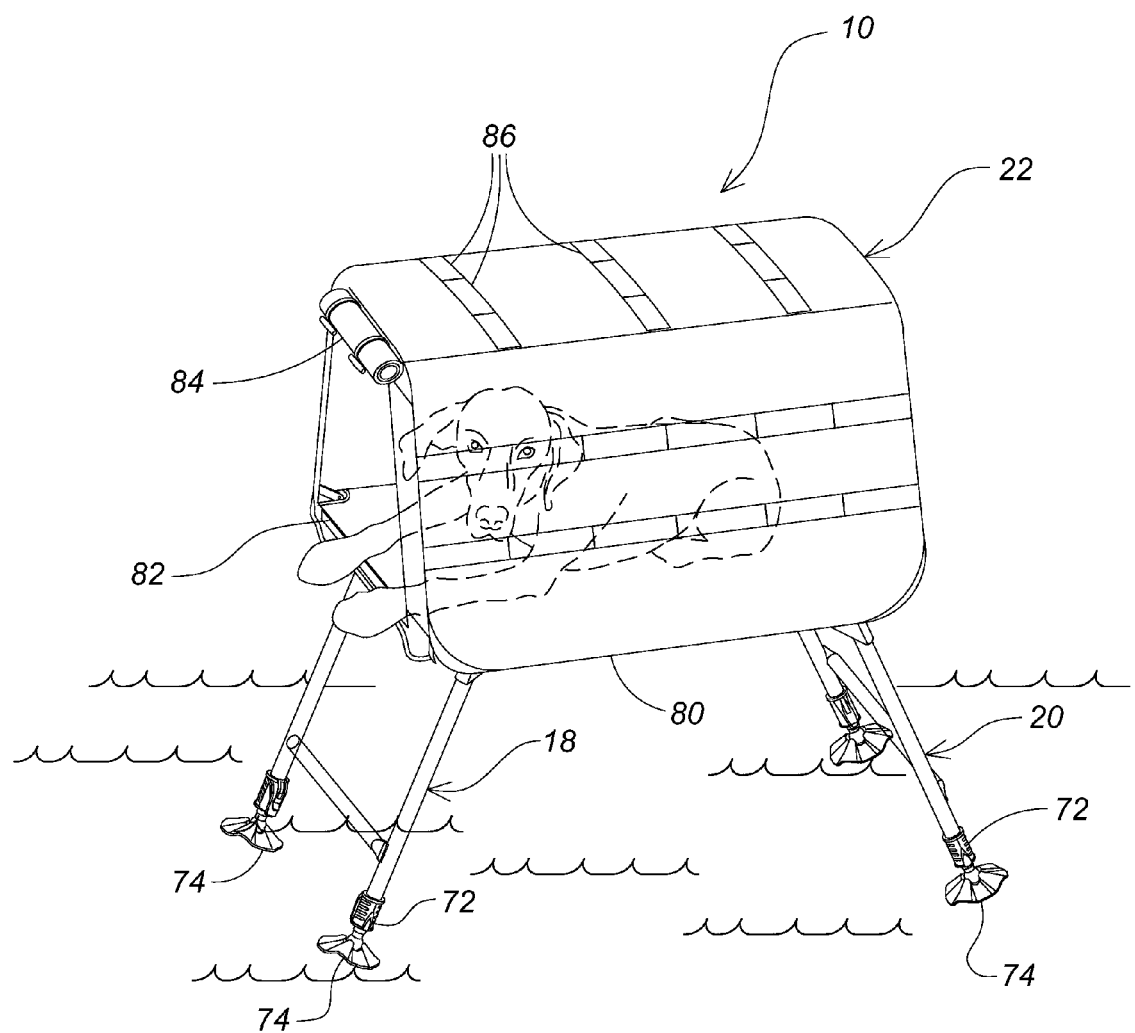
FIG. 1 is a perspective view of a multi-functional hunting apparatus in accordance with the present invention in use as a water blind.

The following detailed description is merely exemplary in nature and is not intended to limit the described embodiments or the application and uses of the described embodiments. As used herein, the word "exemplary" or "illustrative" means "serving as an example, instance or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front,", "vertical," "horizontal," or the like and derivatives thereof shall relate to the invention as oriented in FIG. 1. Furthermore, there is no intention to be bound by any expressed or implied theory presented in the preceding technical field, background, brief summary or the following detailed description. It is also to be understood that the specific apparatus illustrated in attached drawings, and described in the following specification, is simply an exemplary embodiment of the inventive concepts defined in the appended claims. Hence specific dimensions and other physical characteristics relating to the embodiments disclosed herein are not to be considered as limiting, unless the claims expressly state otherwise.

Referring to the drawings more particularly by reference character, reference numeral 10 identifies a hunting apparatus comprising a combination ground blind, water blind and transportation crate in accordance with the present invention. In major part, apparatus 10 includes a rectangular frame 12, first and second canopy supports 14, 16, respectively, first and second pairs of legs 18, 20, respectively, and a cover 22. The frame, legs and canopy supports may be formed of lightweight tubular aluminum or any other type of material keeping within the spirit of this invention to provide a light-weight apparatus.

Figure 2:
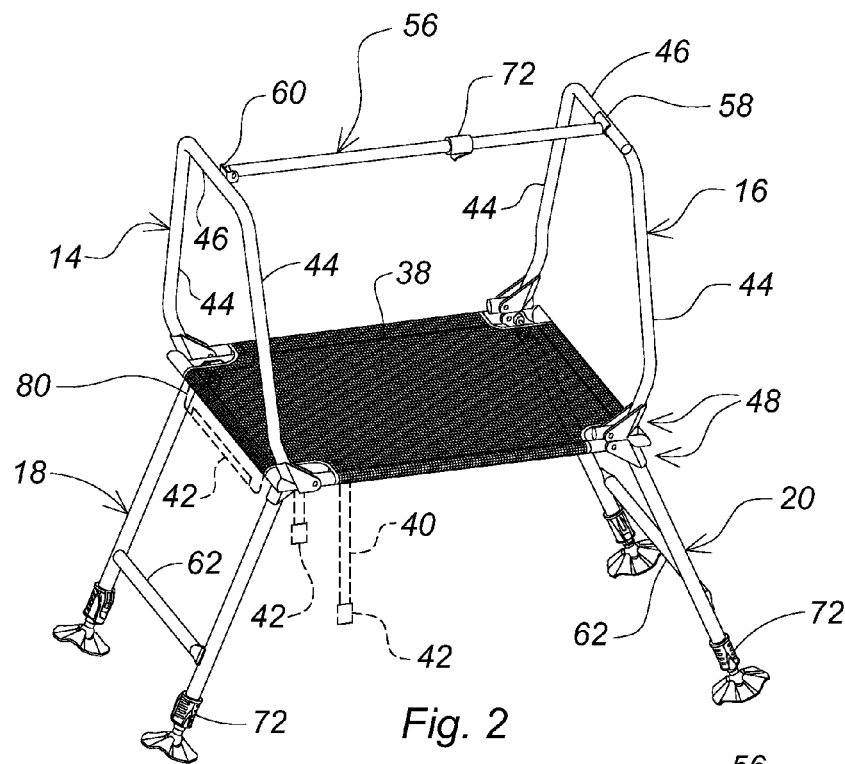
FIG. 2 is a perspective view like FIG. 1 but with the cover removed.
Figure 3:
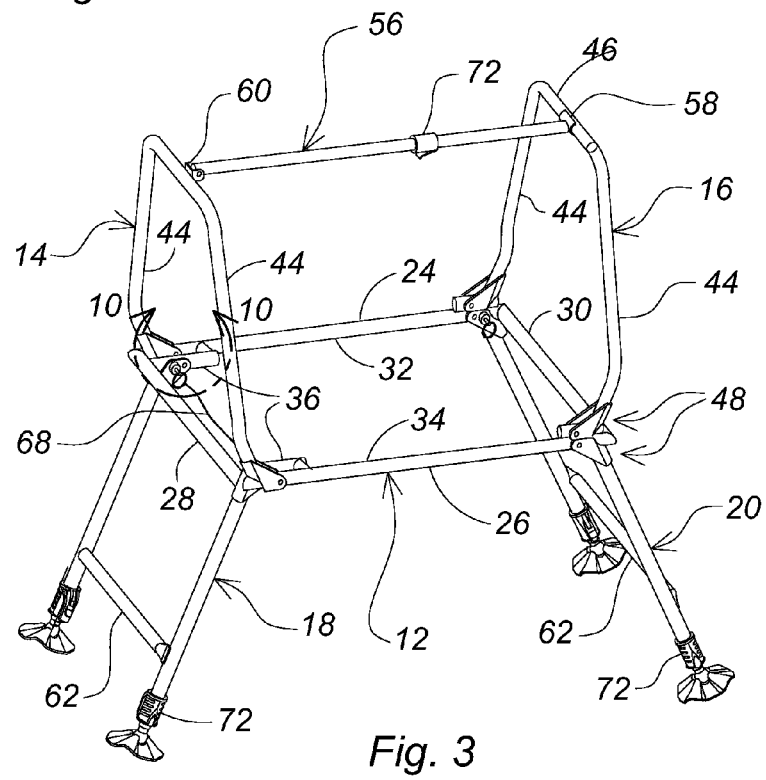
FIG. 3 is a perspective view like FIG. 2 but with the platform removed.

Rectangular frame 12 has a top and bottom side 24, 26, respectively, and first and second ends, 28, 30 and a pair of longer sides 32, 34. As shown in FIG. 3 and in enlarged FIG. 10, a pair of segments 36 are spaced inboard and generally parallel to longer sides 32, 34. Segments 36 are attached to one of first and second ends, 28, 30 and to sides 32, 34. A water permeable material such as mesh, interwoven straps, or the like is provided to provide drainage and is attached to frame 12 to form a platform 38. For example as shown in FIG. 2, a network of interlaced straps 40, an illustrative one of which is shown and ends of which are joined with hook-and-pile fasteners 42, may be provided under rectangular frame 12 for attaching platform 38 to rectangular frame 12.

Canopy supports 14, 16 are U-shaped members, each of which has a pair of legs 44 connected with a bight 46 which as shown in the drawings may be generally flat. Legs 44 of canopy supports 14, 16 are pivotally attached to sides 32, 34 of rectangular frame 12 near first and second ends 28, 30 by a hinge assembly 48 so that canopy supports 14, 16 fold flat against top side 24 of frame 12. As shown, the same type of hinge assembly 48 may be used to pivotally attached canopy supports 14, 16 and first and second pairs of legs 18, 20 as more particularly discussed below and as illustrated in FIG. 8. Hinge assembly 48 includes a U-shaped stirrup 50 with sidewalls 51 which in the case of canopy supports 14, 16 grip rectangular frame 12 along longer sides 32, 34 at a point proximate first and second ends 28, 30. In erected condition, a bight 52 of stirrup 50 prevents further rotation of canopy supports 14, 16 on a hinge pin 54 beyond generally perpendicular to rectangular frame 12 in erect condition. An adjustable support member 56 interconnects bights 46 and tensions canopy supports 14, 16 in erect position. As illustrated support member 56 is journaled 58 to one of bights 46 and has a C-shaped clamp 60 for gripping the other of bights 46.

A cross brace 62 is provided between the first pair of legs 18 and a similar cross brace is provided between second pair of legs 20 to lend strength and rigidity to the assembly. First and second pairs of legs 18, 20 are foldably attached to bottom side 26 of frame 12 with hinge assemblies 48 which may be like those discussed above for canopy supports 14, 16. As shown in FIGS. 3 and 10, one of first and second pairs of legs 18, 20 is pivoted to segments 36 such that it nests in the other of first and second pairs of legs 18, 20 in collapsed condition. A spring loaded pin 66 extending through one of stirrup sidewalls 51 and into rectangular frame 12 may be used to lock first and second pairs of legs 18, 20 in unfolded position generally perpendicular to rectangular frame 12 such that when a dog jumps from platform 38 first and second pairs of legs 18, 20 do not fold and platform 38 does not rock. To facilitate release of spring loaded pin from the legs, a body member 68 such as a cord, wire or the like may connect the spring load pins 66 in each of first and second pairs of legs 18, 20. The pins may be simultaneously released by pulling on body member 68. All the legs in first and second pairs of legs 18, 20 may be formed from a single length of tubing. In other embodiments, the legs may have telescoping sections 70 as shown in FIGS. 5 and 5A such that the length of each leg is independently adjustable and may be locked in length with a spring loaded clamp 72 such that apparatus 10 may be used in shallow or deeper water and can be adjusted to an uneven support surface without being wobbly. A distal end of each of legs 18, 20 may be provided with a lily pad or web foot 74 that settles into the support surface and acts like a suction cup locking first and second pairs of legs 18, 20 in place. As shown in FIG. 5, one or more holes 76 may be provided in web foot 74 for use with a stake 78 to further stabilize the blind in erect condition.

Cover 22 may be formed with a camouflage pattern and is draped over canopy supports 14, 16 and extends down over and is attached to rectangular frame 12 forming an enclosure. Cover 22 may be attached to canopy supports 14, 16 and frame 12 with hook and pile fasteners, snaps, clips or other suitable means such that it may be removed for cleaning if desired. To this end a lower edge 80 of cover 22 may extend around rectangular frame 12 sufficient to be releasably secured to an undersurface of the frame with hook-and-pile fasteners 42, etc. An opening 82 is provided in a wall of cover 22 near first or second ends 28, 30 through which a dog may enter the enclosure. When opening 82 is provided with a flap 84, opening 82 may be closed with flap 84 using zippered elements, hook-and-pile fasteners, snaps, releasable tape or the like. With flap 84 closed, apparatus 10 may be used as a transportation crate as more particularly described below. For ventilation, a second opening (not shown) which may be the same size or different in size may be provided in a wall of cover 22 opposite first opening 82 and also be closed with a flap. Straps 86 may be provided on cover 22 for attaching vegetation such as grass for improved camouflage.

In use and as shown in FIG. 7 when canopy supports 14, 16 and first and second pairs of legs 18, 20 are folded flat against rectangular frame 12, apparatus 10 is compact for storage and for carrying to a hunting site which may entail a long walk through wet and marshy areas. With cover 22 in place and flap 84 closed and with canopy supports 14, 16 in erect condition as shown in FIG. 6 with adjustable support member 56 deployed, apparatus 10 may be used as a kennel for transporting a hunting dog to the hunting site. Upon arrival at a hunting site, apparatus 10 as shown in FIG. 6 with adjustable support member 56 tensioning canopy supports 14, 16 may be used as a ground blind for hunting upland game birds with flap 84 open. This is particularly advantageous as the hunting dog will be supported by folded first and second pairs of legs 18, 20 on platform 38 above the wet and cold ground which contact may be very uncomfortable or harmful for the dog. It is also advantageous for training as the dog may reasonably distinguish between platform 38, where he is expected to stay undercover and camouflaged, and the ground. This is an advantage over ordinary ground blinds where the dog is on the ground and may creep out because he cannot reasonably distinguish between the ground inside the enclosure and outside the enclosure, spoiling the hunt.

For waterfowl hunting in shallow water as shown in FIG. 1, first and second pairs of legs 18, 20 may be unfolded and extended as needed to provide a stable platform 38 on which the dog may sit comfortably and dry, out of the elements and camouflaged. When called upon to retrieve a duck or goose, the dog may jump from platform 38 without upsetting apparatus 10. Upon jumping back onto platform 38, water shedding from the dog drips through platform 38 giving him a comfortable place to sit that is relatively dry and out of the elements.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill Hence as various changes could be made in the above constructions without departing from the scope of the invention, it is intended that all matter contained in the above description or shown in the accompanying drawings shall be interpreted as illustrative and not in a limiting sense.

What is claimed:

1. A combination ground blind, water blind and transportation crate for a dog comprising
    a generally rectangular frame having a first end, a second end and two sides with a mesh or web water permeable material releasably connected around the frame forming a platform;
    a first and second U-shaped frame, each U-shaped frame having legs connected with a bight, said legs pivotally attached to the frame near the first and second ends, the first and second U-shaped frames tensioned apart by a support member being adjustable in length and journaled to one of the bights when pivoted generally perpendicular to the rectangular frame in erect condition; said first and second U-shaped frames folding generally flat against a top surface of the rectangular frame in collapsed condition;
    a first pair of legs and a second pair of legs, said first and second pair of legs pivotally attached to the sides of the frame by hinge assemblies near the first and second ends, respectively, at least one leg of each of said first and second pair of legs having a lock for securing the first and second pairs of legs when pivoted generally perpendicular to the rectangular frame in erect condition; and pivoted by said hinge assemblies generally parallel under the frame in collapsed condition with the platform supported above the ground on the folded legs;
    a flexible cover supported by the first and second tensioned U-shaped frames in erect condition, said cover having lower edges which are adapted to extend around said rectangular frame along the end and sides sufficient to be releasably secured to an undersurface of said frame, at least one opening in the cover near to the first or second end of the frame, said opening being of a size sufficient to function as an entrance for the dog that will use the combination as a ground blind, water blind or transportation crate, said opening having a closure flap adapted to releasably close the opening;
    whereby the combination may be used as a ground blind or a transportation crate when said first and second U-shaped frames are erect and tensioned and the first and second pairs of legs are folded against the bottom surface of the rectangular frame and
    whereby the combination may be used as water blind when said first and second U-shaped frames are erect and tensioned and the first and second pairs of legs are pivoted and locked generally perpendicular to the frame.

2. The combination of claim 1 wherein the first pair of legs is interconnected with a first cross member and the second pair of legs is interconnected with a second cross member.

3. The combination of claim 2 wherein each leg of the first pair of legs has a pin lock for securing the first pair of legs erect generally perpendicular to the frame, said pin locks directly interconnected by a first cable that when pulled releases the pin locks, and wherein each leg of the second pair of legs has a pin lock for securing the second pair of legs erect generally perpendicular to the frame, said pin locks directly interconnected by a second cable that when pulled releases the pin locks.

4. The combination of claim 2 wherein each leg of the first and second pair of legs is independently adjustable and lockable in length.

5. A combination ground blind, water blind and transportation crate for a dog comprising
    a generally rectangular frame having a first end, a second end and two sides with a mesh or web water permeable material releasably connected around the frame forming a platform; said frame having first and second frame segments spaced inboard the sides of the frame, said frame segments generally parallel to the sides and attached to one of said first and second ends and to said sides;
    a first and second U-shaped frame, each U-shaped frame having legs connected with a bight, said legs pivotally attached to the sides of the frame near the first and second ends, respectively, a support member interconnecting the bights of the first and second U-shaped frames, said support member being adjustable in length for tensioning the first and second U-shaped frames when pivoted generally perpendicular to the rectangular frame in erect condition; said first and second U-shaped frames folding generally flat against a top surface of the rectangular frame in collapsed condition;
    a first pair of legs interconnected with a first cross member and a second pair of legs interconnected with a second cross member, one said first and second pair of legs pivotally attached to the first and second frame segments and said other of said first and second pair of legs pivotally attached to the sides of the frame, at least one leg of each of said first and second pair of legs having a lock for securing the first and second pairs of legs erect when pivoted generally perpendicular to the rectangular frame in erect condition; each leg in said first and second pairs of legs being independently adjustable in length; one said first and second pairs of legs nesting inside the other of said first and second pairs of legs when said first and second pairs of legs are folded generally flat in collapsed condition against a bottom surface of the rectangular frame;
    a flexible cover supported by the first and second U-shaped frame and support member, said cover having lower edges which are adapted to extend around said rectangular frame sufficient to be releasably secured to an undersurface of said frame when the U-shaped frames are in erect condition and tensioned with the support member, at least one opening in the cover near to first or second end of the frame, said opening being of a size sufficient to function as an entrance for the dog that will use the combination as a ground blind, water blind or transportation crate, said opening having a closure flap adapted to releasably close the opening;

whereby the combination may be used as a ground blind or a transportation crate when said first and second U-shaped frames are pivoted generally perpendicular to the rectangular frame and the first and second pairs of legs are folded generally flat against the bottom surface the rectangular frame and whereby the combination may be used as water blind when said first and second U-shaped frames and first and second pairs of legs are pivoted generally perpendicular to the frame.

6. The combination of claim 5 wherein each leg of the first and second pairs of legs terminates in an enlarged foot, said foot having a hole adapted for use with a stake for staking the blind.

7. The combination of claim 5 having a second opening in the cover at the first or second end opposite the first opening, said second opening being of a size different from the first opening and having a second closure flap adapted to releasably close the second opening.

8. The combination of claim 7 wherein the first and second flaps are zipper closed.

9. The combination of claim 5 wherein the platform formed of mesh or web water permeable material is support by and removably attached to the frame with interlaced straps adjustable in length and coupled together with hook-and-pile fasteners and the lower edges of the cover are attached to an underside of the rectangular frame with hook-and-pile fasteners.

10. The combination of claim 5 wherein the cover is camouflaged with grass straps.

\* \* \* \* \*